United States Patent
Komarov et al.

(10) Patent No.: US 7,680,996 B2
(45) Date of Patent: Mar. 16, 2010

(54) METHOD AND SYSTEM FOR SHRINKING A SET OF DATA USING A DIFFERENTIAL SNAPSHOT, A WATCH-LIST STRUCTURE ALONG WITH IDENTIFYING AND RETAINING UPDATED BLOCKS

(75) Inventors: Konstantin Komarov, Freiburg (DE); Oleg Fateev, Moscow (RU); Maxim Melkov, Moscow (RU); Vladimir Usatyuk, Moscow (RU)

(73) Assignee: Paragon Software GmbH, Buggingen (DE)

( * ) Notice: Subject to any disclaimer, the term of this patent is extended or adjusted under 35 U.S.C. 154(b) by 374 days.

(21) Appl. No.: 11/621,539

(22) Filed: Jan. 9, 2007

(65) Prior Publication Data
US 2008/0082593 A1    Apr. 3, 2008

Related U.S. Application Data

(60) Provisional application No. 60/827,243, filed on Sep. 28, 2006, provisional application No. 60/829,301, filed on Oct. 13, 2006.

(51) Int. Cl.
G06F 13/00        (2006.01)

(52) U.S. Cl. ........................ 711/162; 711/168
(58) Field of Classification Search ........... 711/162, 711/168
See application file for complete search history.

(56) References Cited

U.S. PATENT DOCUMENTS

| 2005/0027819 A1* | 2/2005 | Nakano et al. ............... 709/217 |
| 2005/0086432 A1* | 4/2005 | Sakai .......................... 711/114 |
| 2008/0016293 A1* | 1/2008 | Saika .......................... 711/154 |

* cited by examiner

*Primary Examiner*—Reba I Elmore
(74) *Attorney, Agent, or Firm*—Dort Patent, P.C.

(57) ABSTRACT

At the beginning of an online backup operation, the backup software system creates a snapshot of source data storage. The snapshot includes a watch-list used for identifying blocks of a source storage which are watched by snapshot management means for update. If a block included into the watch-list was requested for update, the snapshot management means preserve original contents of that block in a retention container for the purpose of temporary store. The retention container includes a set of temporal stores dedicated for transient storing of blocks until they are backed up. Backed up blocks can be operatively excluded from the snapshot so that unchanged blocks are excluded from the watch-list and updated blocks are removed from the retention container.

11 Claims, 14 Drawing Sheets

Embodiment Architecture

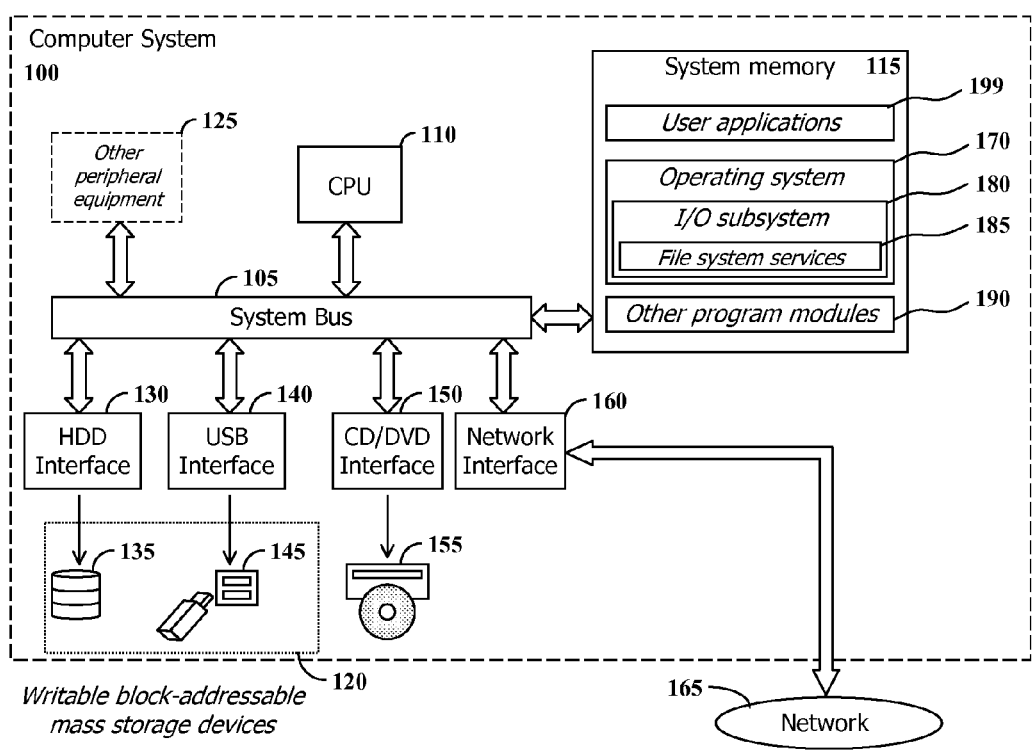
Fig.1. Desired computer environment

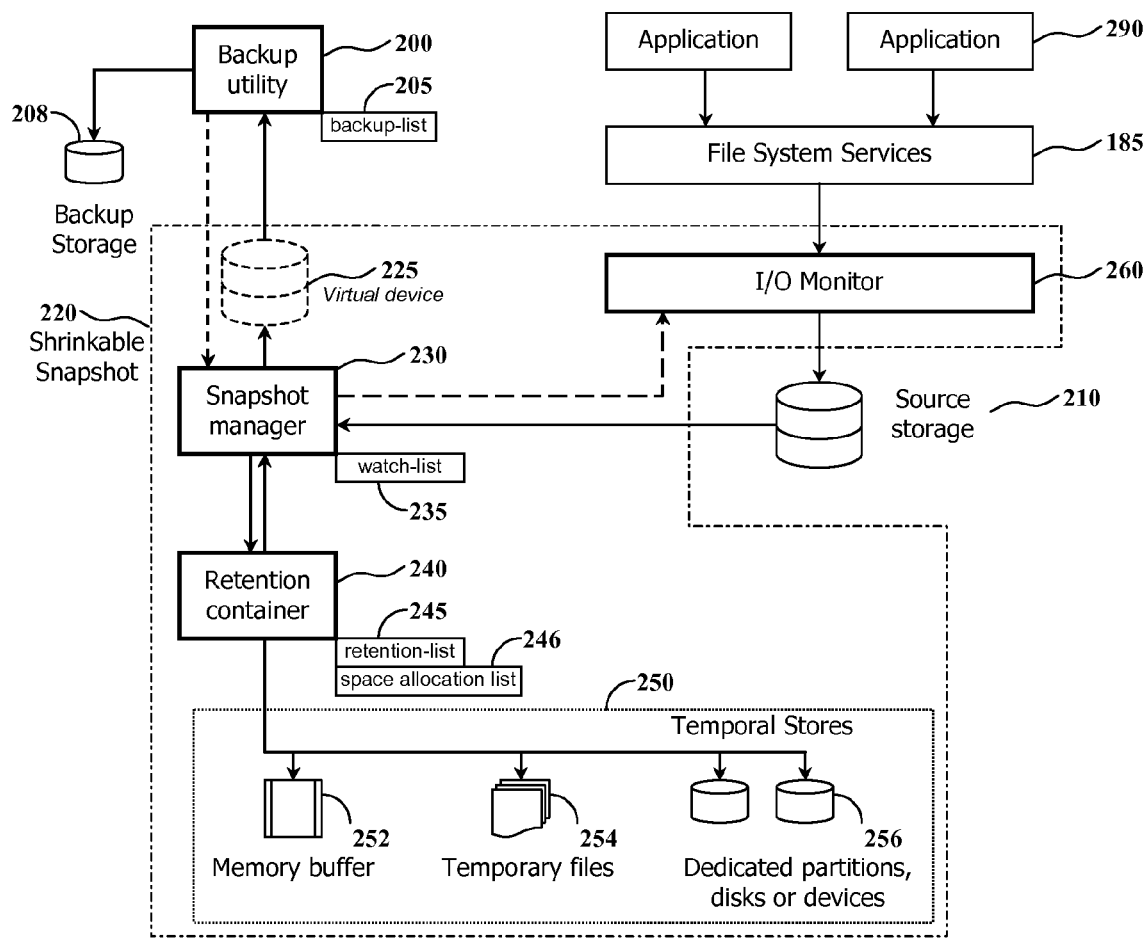
Fig.2. Embodiment Architecture

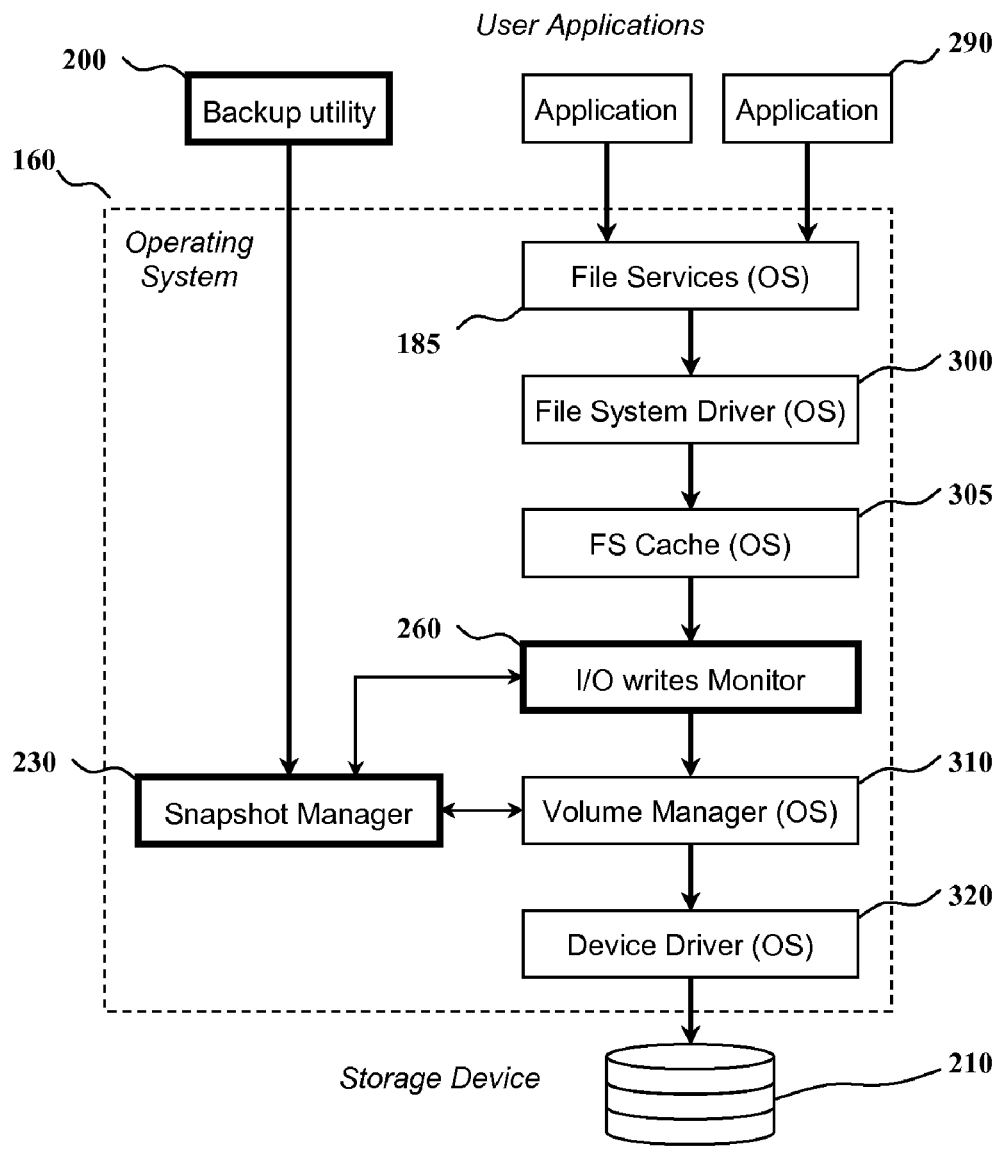
*Fig.3. Integration to an Operating System*

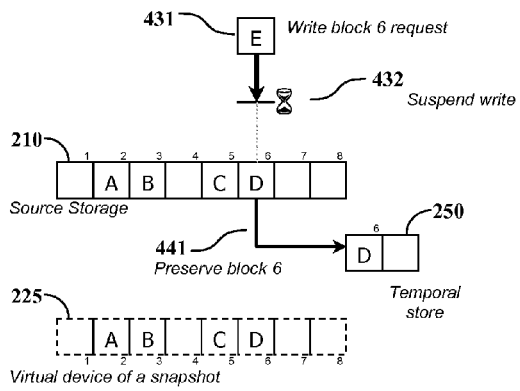
Fig.4A Suspending an I/O write request and preserving updating block 6
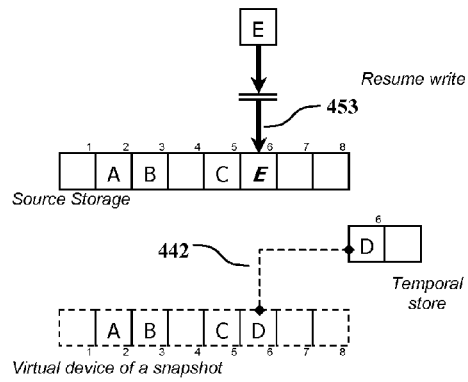
Fig.4B Resuming I/O write and updating block 6
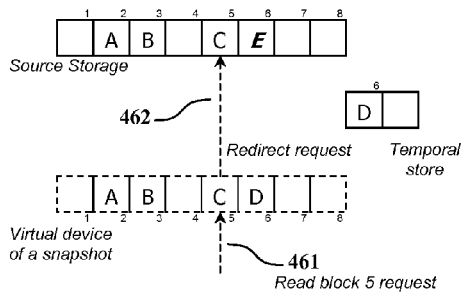
Fig.4C Unchanged block 5 is requested
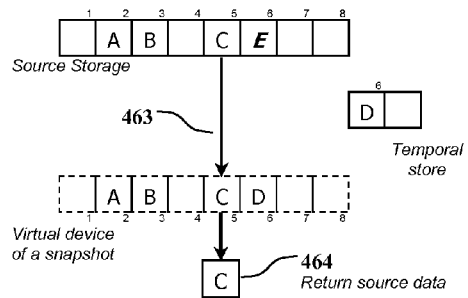
Fig.4D Unchanged block 5 is read from source storage
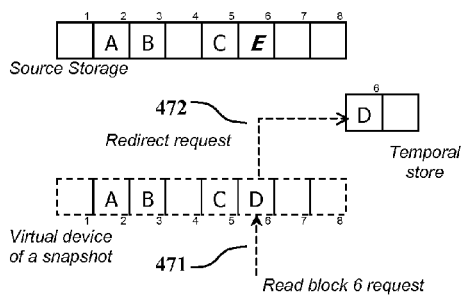
Fig.4E Updated block 6 is requested
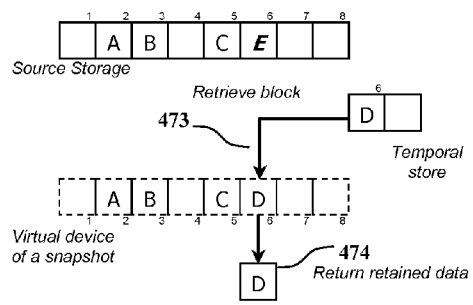
Fig.4F Original copy of updated block 6 is retrieved from retention container

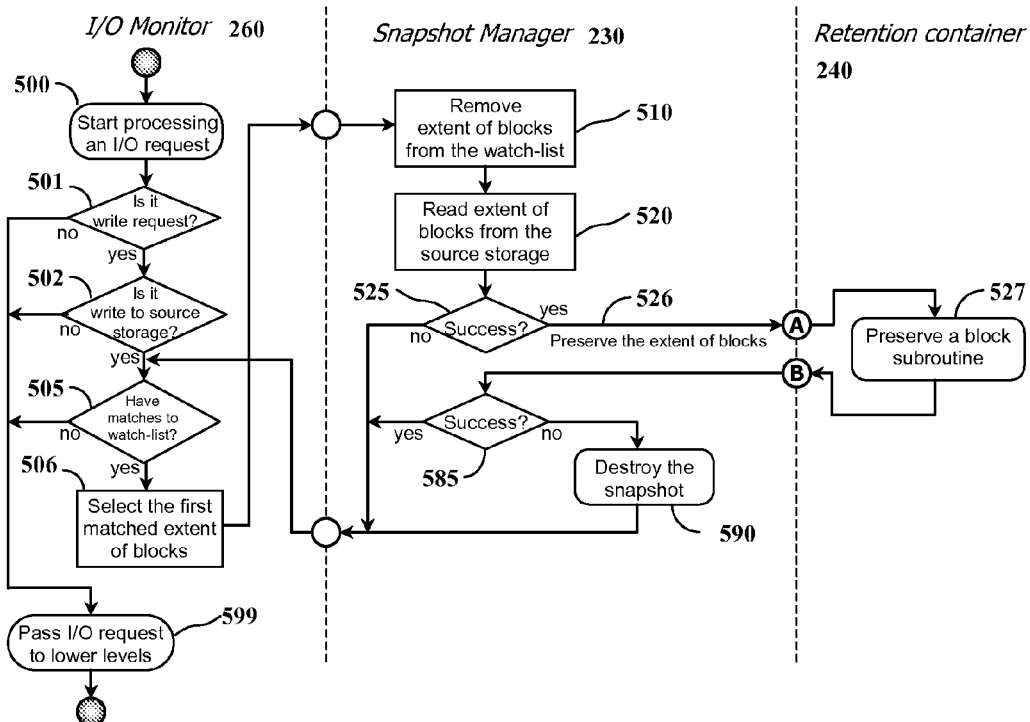
*Fig.5A. Processing I/O requests*
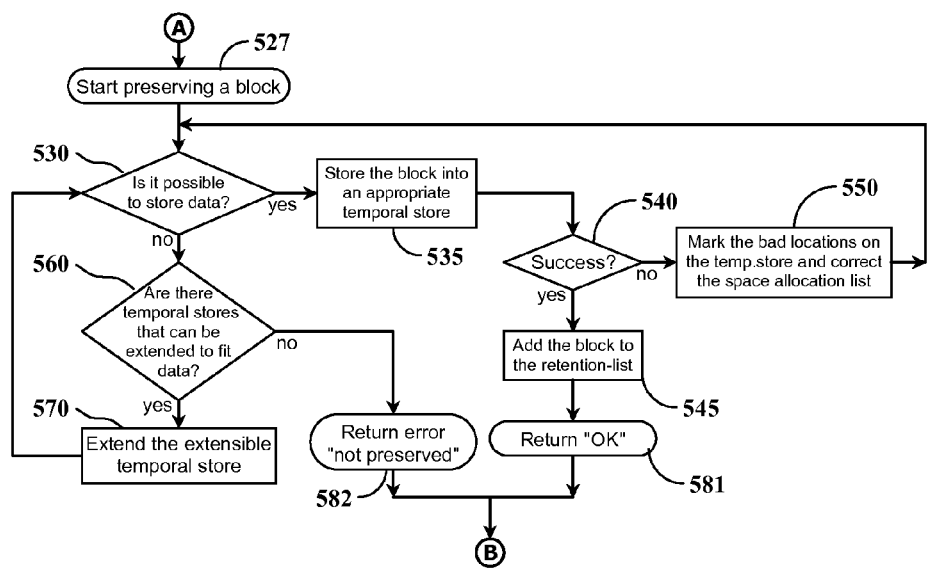
*Fig.5B. Preserving a block in the retention container*

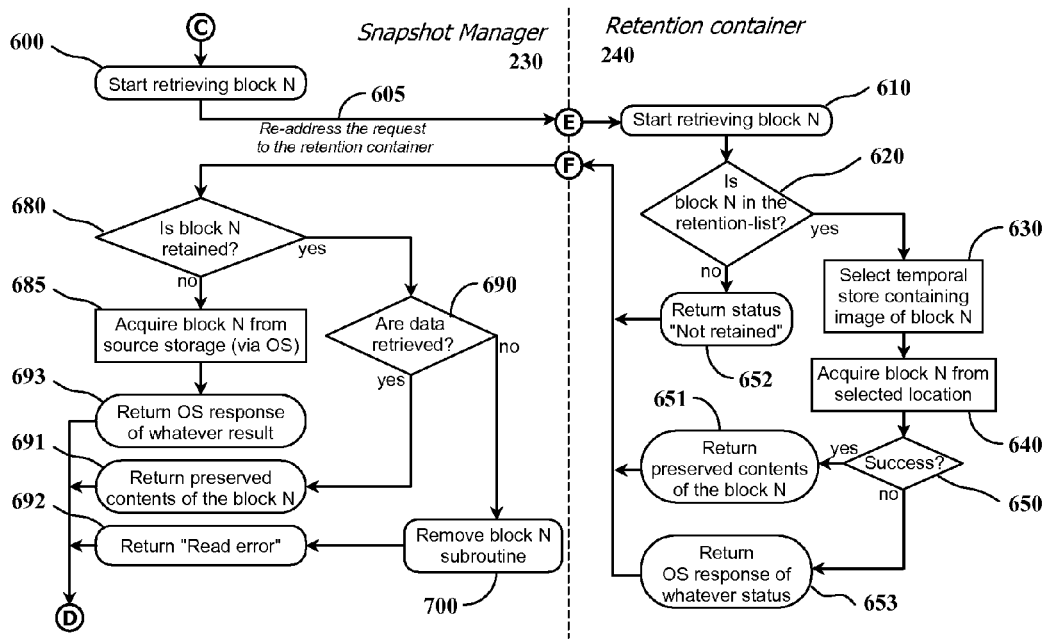
*Fig.6. Retrieving blocks from the snapshot*
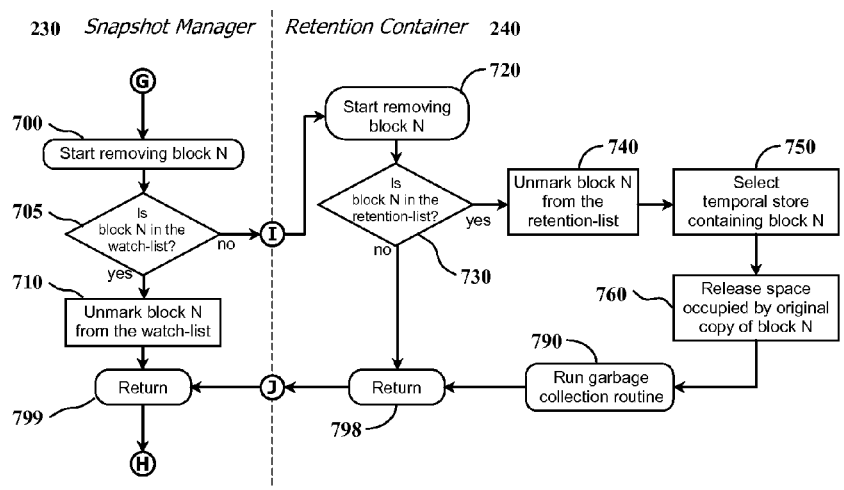
*Fig.7. Shrinking snapshot components (by removal of snapshotted blocks)*

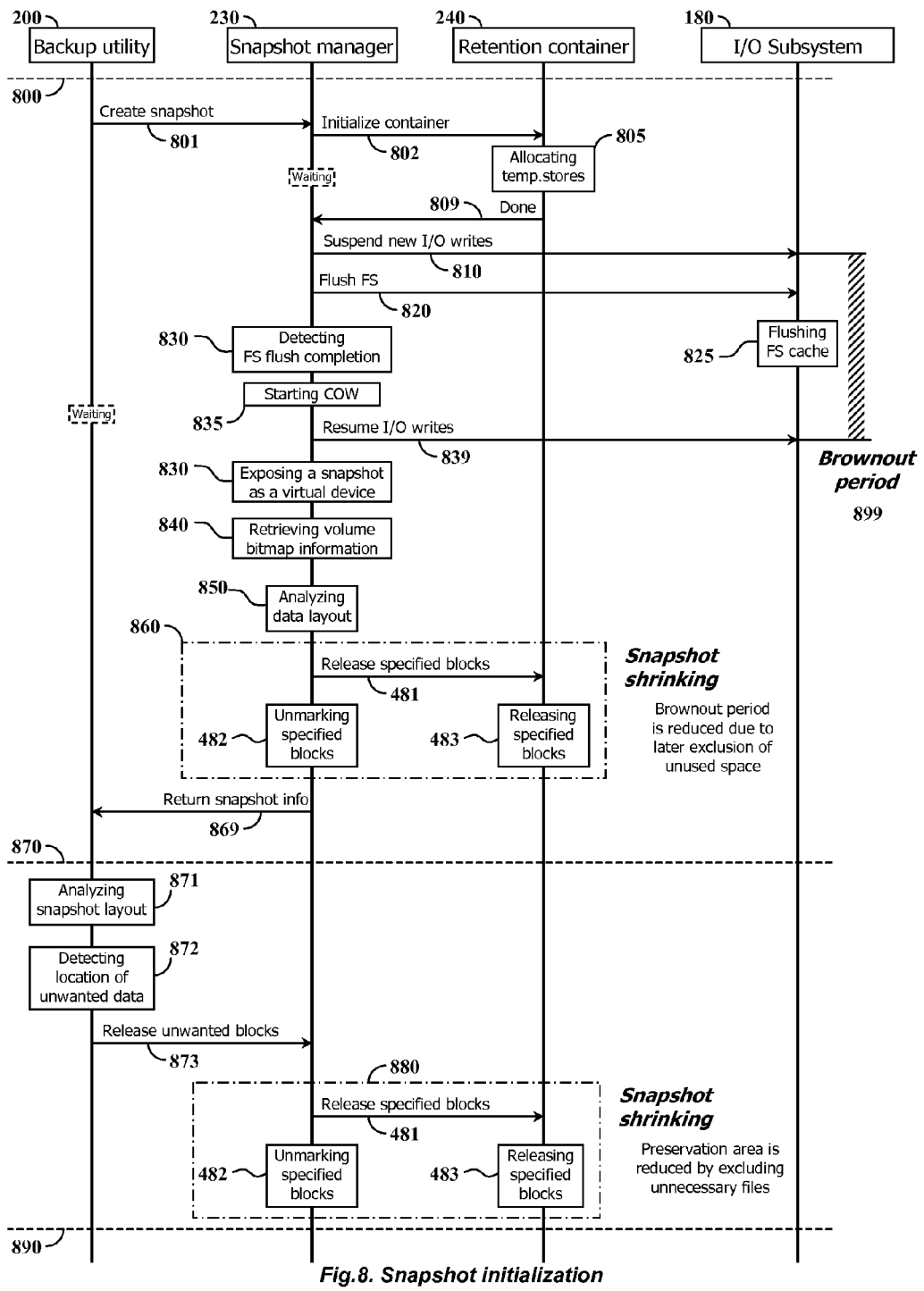
Fig. 8. Snapshot initialization

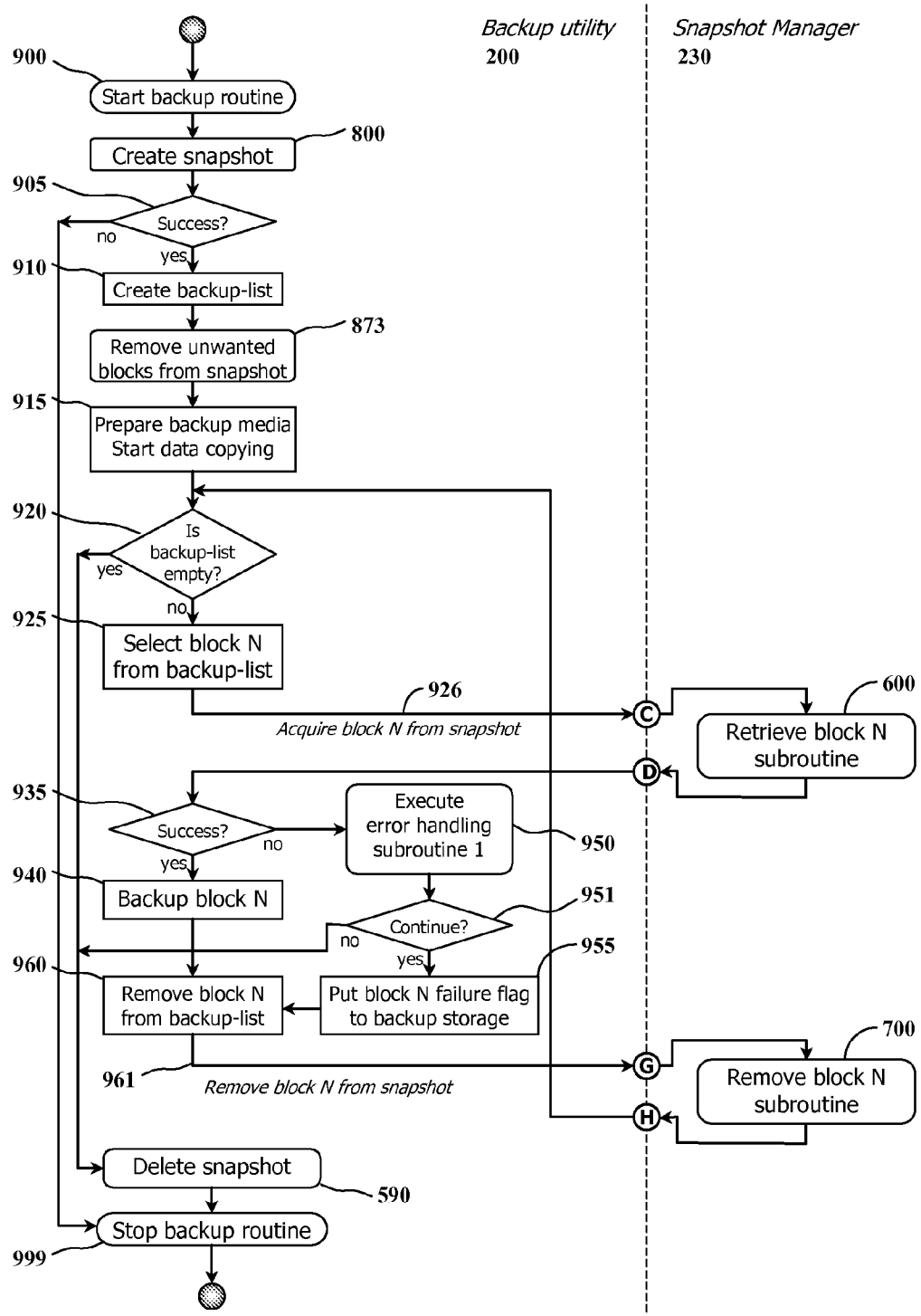
Fig.9. Backup routine based on a shrinkable snapshot

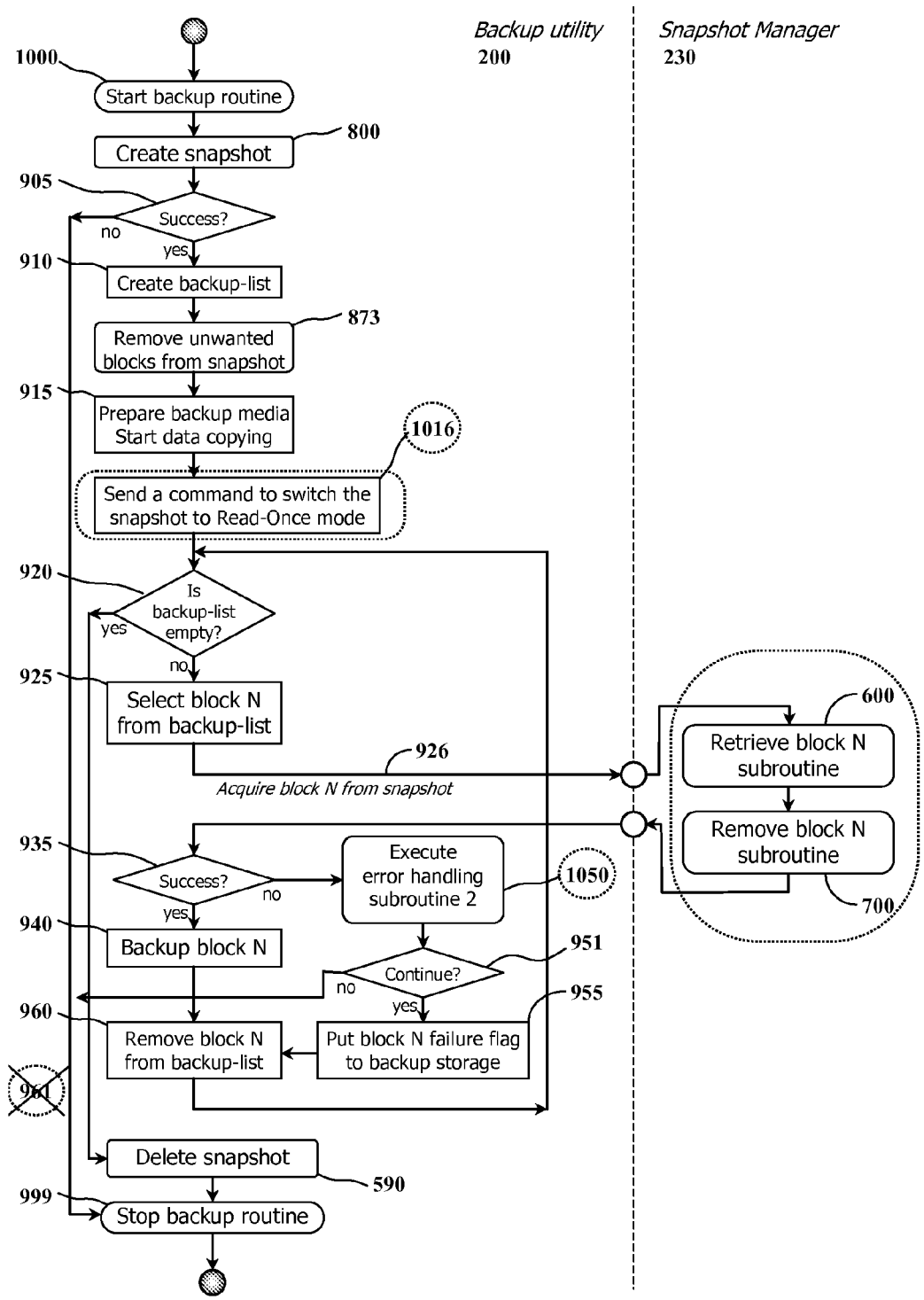
Fig.10. Backup routine based on a read-once shrinkable snapshot

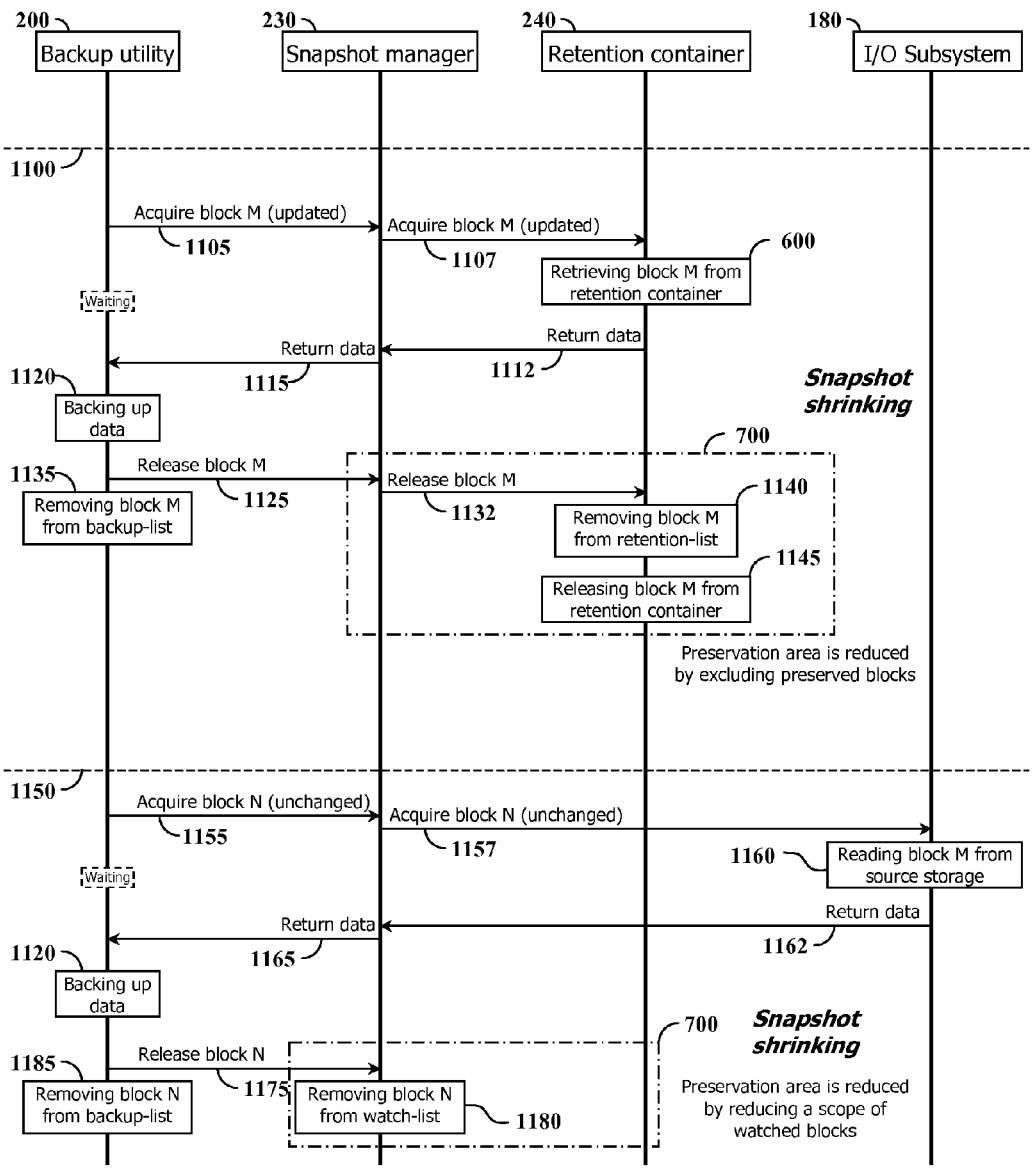
Fig.11. Backup of blocks in a standard mode

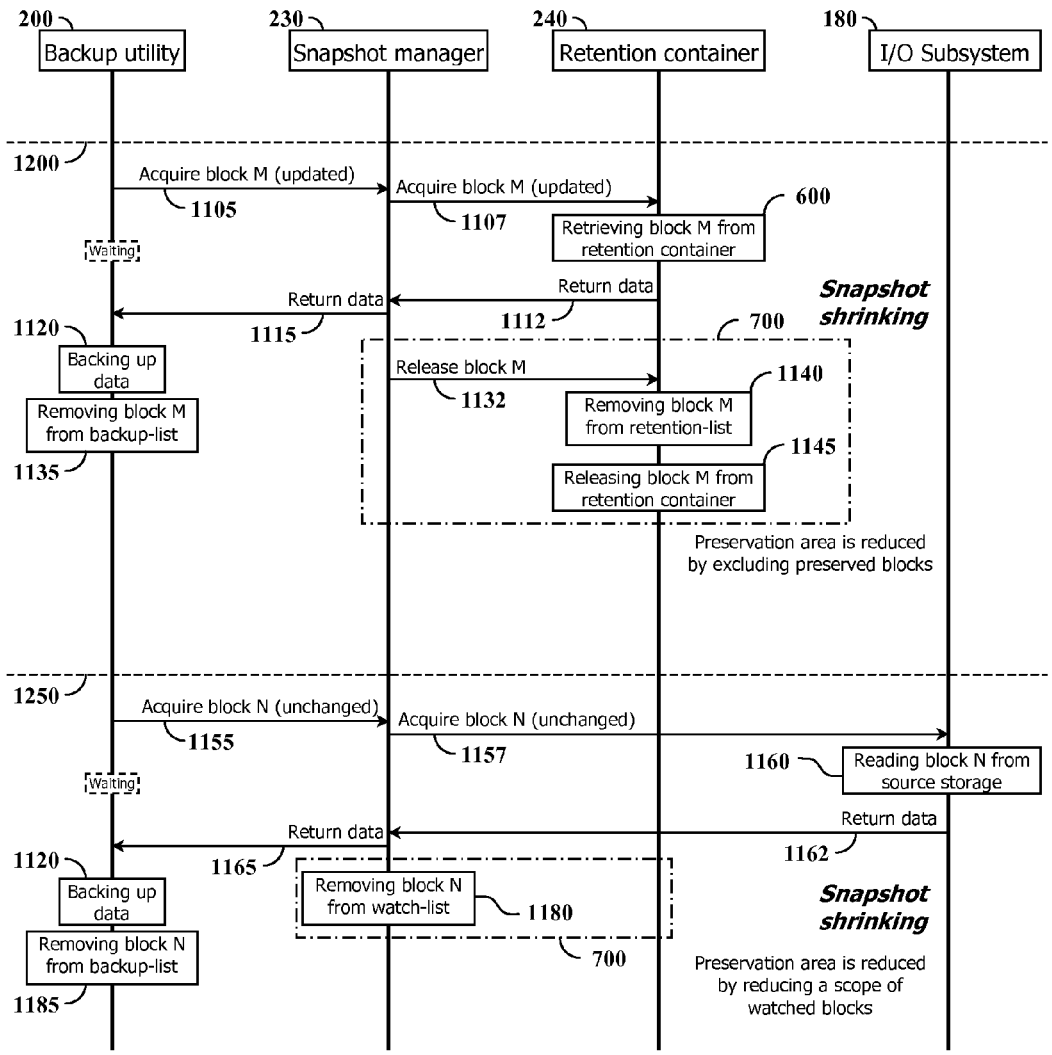
Fig.12. Backup of blocks in "read-once" mode

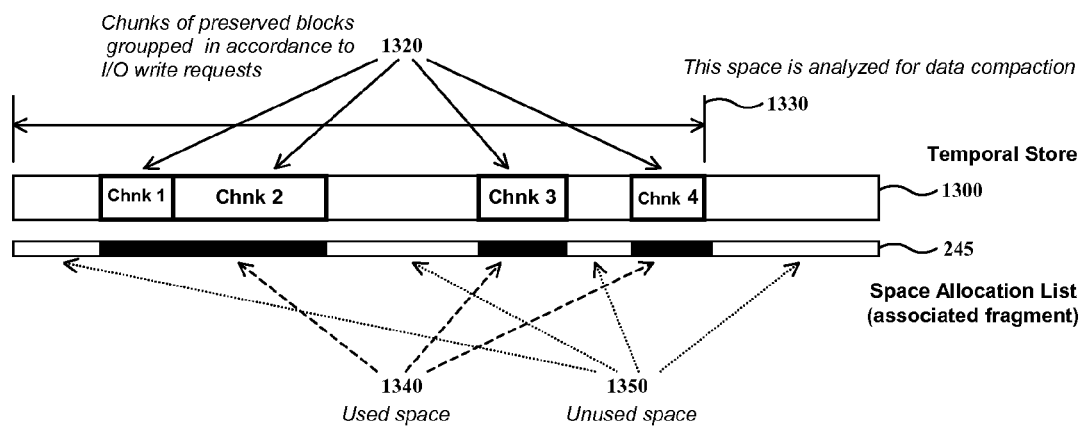
Fig.13. Space allocation list and temporal store layout

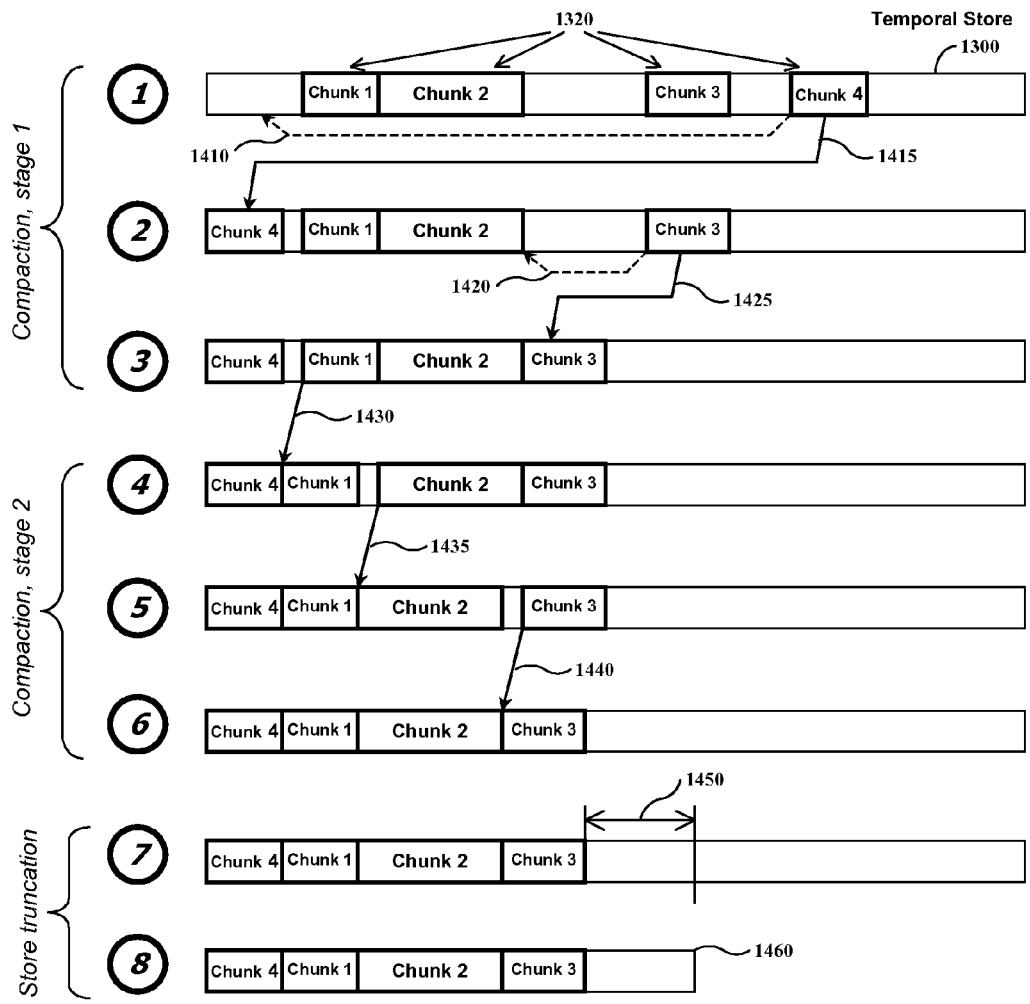
Fig.14. Compacting and shrinking temporal stores

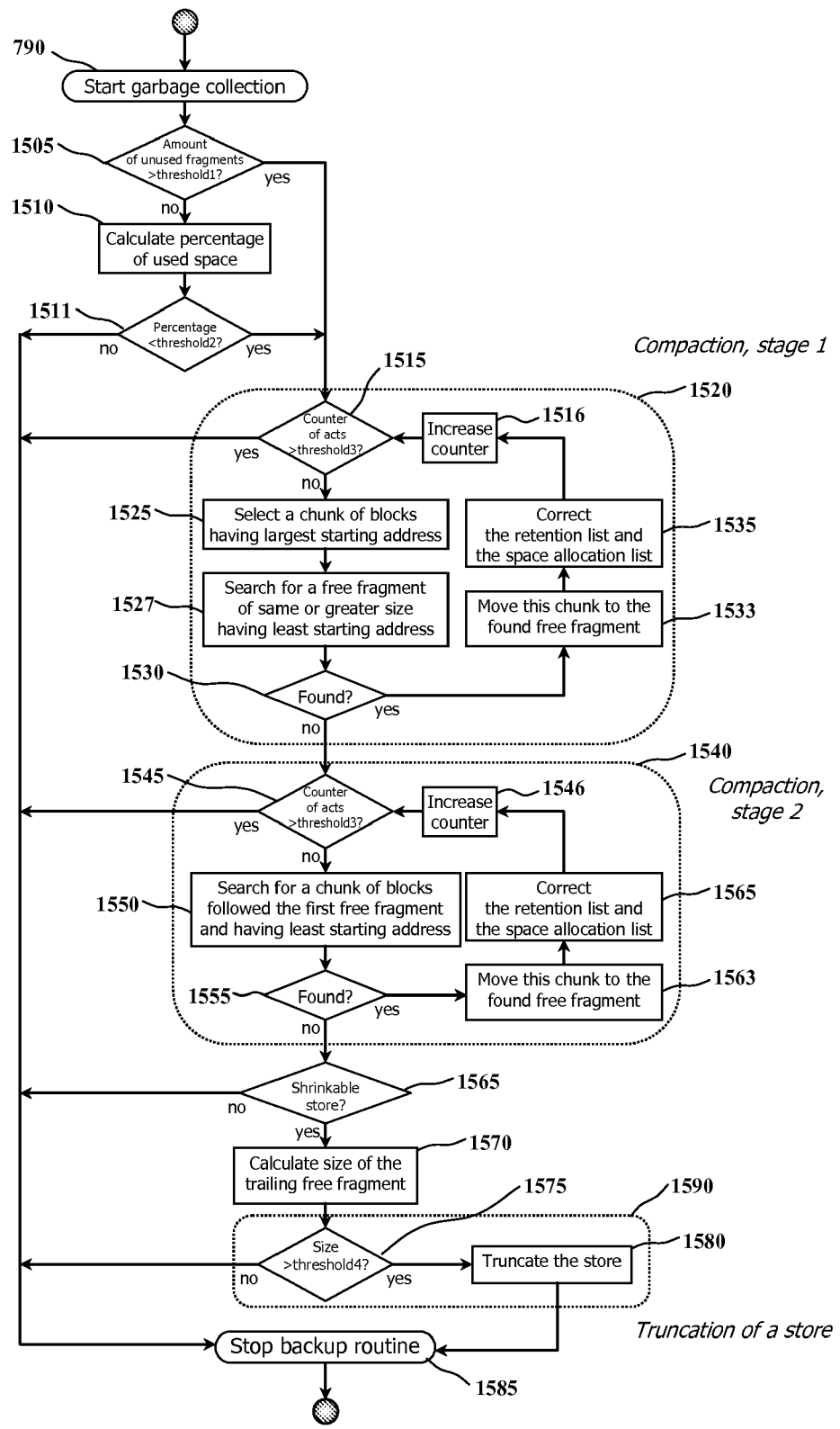
Fig.15. Garbage collecting routine

METHOD AND SYSTEM FOR SHRINKING A SET OF DATA USING A DIFFERENTIAL SNAPSHOT, A WATCH-LIST STRUCTURE ALONG WITH IDENTIFYING AND RETAINING UPDATED BLOCKS

REFERENCE TO PRIORITY DOCUMENTS

The present application claims priority to U.S. Provisional Application Ser. No. 60/827,243, filed Sep. 28, 2006, and U.S. Application Ser. No. 60/829,301, filed Oct. 13, 2006, both of which are incorporated by reference for all purposes.

FIELD OF THE INVENTION

The present invention is related to the field of methods and systems for online data backup and, more specifically, to methods of online data backup that utilize differential snapshots.

BACKGROUND OF THE INVENTION

Data backup is an essential part of a maintenance plan for any computer system because it is the only remedy against data loss in case of disaster. The fundamental requirement to backup is keeping data integrity. When online data are backed up, both production and backup software access data in parallel and so parts of source data can be modified before they have been backed up. So that backup software should provide coherency of backed up online data in order to supply backup integrity.

There several methods have been invented to provide data coherency in online backup, from which the most advantageous are ones based on the concept of "snapshots". A snapshot is generally a virtually independent logical copy of data storage (e.g. a volume, a disk, a database or the like) at a particular instant in time. There are file system level and block level implementations of snapshots, yet hereafter only the block-level snapshots are discussed because of their universality and therefore more convenience for general-purpose backup solutions.

Once a snapshot has been created, it can be exposed as a virtual read-only storage whose data can be accessed via standard I/O functions. As soon as a snapshot has been created, production software continues working with production storage while snapshotted data are commonly used for various maintenance tasks such as backup, replication, verification et cetera. There multiple principles of snapshot operation have been contrived. Their common characteristics are (a) use of extra space to preserve snapshotted data and (b) computing overheads imposed by snapshot management means during snapshot creation, operation or deletion, depending on particular technique.

Modern computer systems manipulate storages of very high capacity, and so it is reasonable that those online backup solutions are desired, which provide shorter backup window, produce less impact on performance and require less resources to operate. The present invention proposes an improvement of performance characteristics of a snapshot and so related materials are discussed here.

Principles of snapshot operation are commonly classified into "full copy" and "differential" snapshots. The most known representative of full copy snapshot methods is the "split-mirror" technique. This technique implies continuous mirroring of production storage to a secondary one at normal operation mode. When a snapshot is created, the mirroring is stopped and the second copy of data is split and used as independent data storage. Before a split-mirror snapshot can be re-used again, it needs the mirror re-synchronization has to be made. Software implementations of split-mirror snapshots impose computing overheads for the whole duration of the data mirroring process.

Differential snapshots are based on the idea of holding only the difference between the current data and point-in-time data corresponding to the moment of snapshot creation. The most known representatives of differential snapshot methods are "copy-on-write" (abbreviated to COW) and "redirect-on-write" (abbreviated to ROW) techniques.

The COW technique makes a copy of original data only at the first time data are updated. No data are stored at the moment of snapshot creation yet a snapshot manager starts monitoring I/O writes on production storage. Once controlled data are to be updated the snapshot manager suspends an update operation, stores original data in an auxiliary storage and then resumes data update. If snapshot contents are requested, the snapshot manager takes unchanged pieces of data from a production storage while for changed pieces their original contents are retrieved from an auxiliary storage. At the deletion of a COW snapshot an auxiliary storage is abandoned and nothing is made on production storage. COW snapshots require no recycling period and, multiple COW snapshots can coexist at same time without affecting each other. The U.S. Pat. No. 5,649,152 issued on Jul. 15, 1997 represents an elaborate development of differential snapshot techniques based on COW technique.

The ROW technique exploits the complement idea to COW: updated data are placed to a new location (e.g. are copied to an auxiliary storage) while original data remain intact on a storage. A snapshot manager virtualizes access to production storage in order to accurately redirect I/O requests. At the deletion of a ROW snapshot all accumulated updates should be merged to an original production storage and this procedure may require noticeable time to complete. A complicated management system is required for maintaining multiple ROW snapshots.

Time required for a snapshot re-cycling may play a decisive role in backup solutions that include a stage of data integrity verification. Under these conditions a COW snapshot-based backup solution may appear a preferred choice between other techniques. On the other hand, a ROW snapshot holds a source production storage frozen in a consistent state corresponding to a moment of snapshot creation, during the backup operation. In case a disaster occurred not destroying storage devices before the backup operation has been finished, a source production storage appear in a ready-to-work consistent state as soon as a system is revived and returned into normal operation.

The advantage of full copy snapshots is that they instantly create a really independent copy of original data, which keep snapshotted data integrity regardless of production system function. The disadvantages are very high storage expenses and prolonged recycling period. Until ultimately required by a field of production application a backup solution based on full copy snapshots is too expensive.

Differential snapshots take much less resources and require short or no recycling period in contrast to full copy snapshots. Their disadvantage is that integrity of differential snapshots is dependent on integrity of source data. In case a source storage fails, a differential snapshot of that storage fails as well. Therefore in the view of post-fault data recovery differential snapshots can only be used as auxiliary means for online data backup.

In contrast to full copy snapshots, differential snapshots require an auxiliary storage to keep only updated data, which is usually much less than entire storage capacity. However in worst case a differential snapshot would require an auxiliary storage to have same capacity as the source data storage.

An improvement of characteristics of differential snapshots has been proposed in the U.S. Pat. No. 5,274,807 issued at Dec. 28, 1993 where it is proposed to store only blocks of the source storage containing data while unused blocks should be ignored. In present-day snapshot technologies it is a standard technique applied in volume-based differential snapshots. This technique eliminates unnecessary acts of blocks preservation from snapshot activity and further reduces requirements to auxiliary storage capacity. Now in worst case a differential snapshot would require an auxiliary storage to have capacity be enough to store all used blocks presented on the source storage at the moment of snapshot creation. For nowaday computer systems such estimation of auxiliary storage capacity is very expensive as well.

Another aspect of the problem is that a general-purpose snapshot may include data that actually are not required to be snapshotted from the point of view of an application that has created and uses a snapshot. However prior art principles used in snapshot operation impede exclusion such data from the preservation area of a snapshot. A snapshot creation procedure is commonly works in the following way: when a snapshot is created, new I/O writes are suspended, uncommitted I/O writes are flushed, then a bitmap of used blocks is acquired from a file system service, the COW or ROW technique is started and finally, a normal I/O activity is resumed. A period of time when I/O writes are suspended is commonly a brownout period for a production system, because production software cannot work with its normal performance. In modern systems the snapshot creation period lasts only few seconds or even less because the query of a bitmap is commonly a very fast operation. However, a routine of searching of unnecessary files and determining their location would take a long while, so that it is not used in prior art snapshot technologies. Instead, a snapshot protects unnecessary files together with necessary ones, and so takes more resources and imposes more overheads than is really needed.

Further reduction of requirements to an auxiliary storage capacity is commonly unavailable for general-purpose differential snapshots without a possibly to change snapshot n ability characteristics after it has been created. The further analysis discloses what kind of functionality should be added a snapshot operation.

After a differential snapshot has been created, and backup process has been started, the snapshot imposes extra impact on a host system performance in two cases: first, when a piece of source data is first time updated since the moment of snapshot creation and second, when a piece of data has been read from the snapshot and it turns out to be retrieved from an auxiliary storage of the snapshot. Both described events have probabilistic behavior. Unfortunately their probability cannot be reduced within the frame of prior art snapshot based technologies.

A snapshot is presumed to function for indefinite period of time and not to change its contents within that period of time regardless of current progress of a backup process and more generally, regardless of how snapshotted data are used. In worst case a differential snapshot may require an auxiliary storage to hold a copy of all source data and, when snapshotted data are read from the snapshot, every piece of data will be searched and retrieved from the auxiliary storage.

BRIEF SUMMARY OF THE INVENTION

The origin of the described problem is that snapshot management means are unaware of how snapshotted data are used and therefore cannot optimize snapshot characteristics. The solution of the problem is to extend snapshot functionality so that to allow backup software interacting with snapshot management means.

The present invention comprises a method for reducing storage expenses and computing overheads required for maintenance of a differential snapshot used in online data backup routine. A snapshot operation improvement is done by implementing a technique that can be briefly characterized as "snapshot shrinking".

Under the term of "snapshot shrinking" the extension of snapshot functionality is identified for reducing the preservation area of a snapshot by excluding specified blocks from the preservation area at any moment of snapshot operation. Snapshot management means must provide an appropriate programming interface to applications for snapshot management of that kind.

There several improvements of snapshot usage can be solved smoothly by using the snapshot shrinking functionality. First, files not required for backup can be excluded from the preservation area of a snapshot after the moment of snapshot creation. So that it will provide a short brownout period at the snapshot creation and a possibility of selective data exclusion from a snapshot. Second, online backup operation can be performed with lower consumption of resources and less overheads as compared with prior art solutions.

From the point of view of data backup, snapshotted blocks are no more required as soon as they have been backed up. In the view of snapshot operation, backed up data neither more require to be preserved by a snapshot nor need further retention of original contents. Equipped with snapshot shrinking functions, a snapshot manager can remove backed up blocks from the preservation area and release their preserved contents from the retention container.

The other side of the described technique is that a snapshot is step-by-step breaking relationship to the source storage blocks. It is no more a point-in-time copy of entire source storage. It is a point-in-time copy of a selected part of a source storage, and so it is referred to as a "shrinkable snapshot".

In the described embodiment of the present invention the snapshot manager provide a programming interface (API) for manual management of snapshot shrinking. In addition, the snapshot manager supports the special read-once operation mode for shrinkable snapshots. In the read-once mode the snapshot manager automatically removes any blocks that being read from a snapshot. The read-once mode is effectively used in block-level backup operations. In this mode, modules of the backup software system can achieve additional performance gain because of better possibilities of working in parallel. An ordinary "read-many" mode is effectively used in file-level online backup operations.

BRIEF DESCRIPTION OF THE DRAWINGS

FIG. 1 is a block diagram illustrating a computer system into which the present invention may be incorporated.

FIG. 2 is a block diagram illustrating architecture of an embodiment of the present invention.

FIG. 3 is a functional block diagram illustrating incorporation of components of an embodiment of the present invention into file data processing within an operating system.

FIG. 4 are schematic diagrams explaining basics of copy-on-write snapshots operation.

FIG. 5 are flowchart diagrams illustrating a processing of write requests on a source storage applied in an embodiment of the present invention.

FIG. 6 is a flowchart diagram illustrating how snapshotted data are retrieved from a snapshot.

FIG. 7 is a flowchart diagram illustrating a routine of removal blocks from a shrinkable snapshot.

FIG. 8 is a time diagram illustrating a snapshot creation and applying snapshot shrinking technique at this stage.

FIG. 9 is a flowchart diagram illustrating a backup routine based on a shrinkable snapshot.

FIG. 10 is a flowchart diagram illustrating a backup routine based on a shrinkable snapshot working in the read-once mode.

FIG. 11 is a time diagram illustrating a backup process in the "read-many" snapshot mode.

FIG. 12 is a time diagram illustrating a backup process in the "read-once" snapshot mode.

FIG. 13 is a functional block diagram illustrating temporal store layout and presenting of layout information in a space allocation list.

FIG. 14 is a functional block diagram illustrating basics of a method for compacting and shrinking temporal stores implemented in the described embodiment.

FIG. 15 is a flowchart diagram illustrating a garbage collection routine.

DETAILED DESCRIPTION OF THE INVENTION

FIG. 1 illustrates a representative computer configuration on which an embodiment of the invention runs. A computer system 100 includes writable block-addressable mass storage devices 120 such as stationary hard disks 135 or removable disks such as USB storage devices 145. The disks can store their information using magnetic, electrical or any other technique for data reading and writing without escaping from the scope of the present invention. A computer system 100 should run under the control of a multi-tasking operating system 170. Optionally a computer system 100 can be connected to a network 165. The present invention discloses principles of operation of a backup software system designed for protecting online data located on mass storage devices 120.

FIG. 2 illustrates architecture of an embodiment of the present invention. A source storage 210 is used to store production data. The disclosed method extends the scope of the present invention for a source storage to be any writable block-addressable storage such as one or more disks, one or more volumes, one or more partitions of same or different disks or a combination of above as well as one or more files located on same or different writable block-addressable storages. Within the frame of the described embodiment the source storage 210 should be one or more logical volumes for which the operating system 170 provides an addressable block-level access. For example, a source storage can be a local basic or a dynamic volume and cannot be a mapped network drive.

Production applications 290 use file system services 185 of an operating system 170 for reading and writing data to the source storage 210. A backup utility 200 is used to backup production data from the source storage 210 to a backup storage 208. In the described embodiment the backup utility 200 allows choose between a file-level and a volume-level backup routines. However, an interior presentation of backed up objects is always a collection of selected blocks of the source storage 210 regardless of what kind of a backup routine has been selected. The scope of selected blocks is stored in the backup-list 205. Details of an interior implementation of the backup-list 205 are generally irrelevant within the scope of the present invention. In the described embodiment the backup-list 205 is a hierarchy of fragmented bitmaps or continual extents of blocks per every logical volume included into the source storage 210, and a particular type of elements is dependent on a criterion of performance and implementation compaction.

To avoid any perceptible suspension of production applications 290 during an online backup routine the backup utility 200 creates a differential snapshot 220 of the source storage 210. Snapshot management means include an I/O monitor unit 260, a snapshot manager unit 230, a retention container unit 240 and a set of temporal stores 250. Snapshot management means require embedding these units into a file I/O requests processing stack within an operating system. An integration of snapshot management means of the embodiment of the present invention into a file I/O stack is illustrated in FIG. 3 where it is presented that snapshot management means should control I/O activity on blocks of logical volumes.

Once created the snapshot 220 is exposed as a virtual block device 225 in the operating system 170. The differential snapshot 220 includes a scope of selected blocks of the source storage 210 for which original contents should be preserved. The scope of selected blocks is stored in the watch-list 235. Details of an interior implementation of the watch-list 235 are generally irrelevant within the scope of the present invention. In the described embodiment the watch-list 235 is a hierarchy of fragmented bitmaps of blocks per every logical volume included into the source storage 210.

The differential snapshot 220 keeps track of updates for blocks of the source storage 210 listed in the watch-list 235 for the purpose to preserve original contents of these blocks in case of update. For this purpose snapshot management means store the updated and unchanged copies of an updated block in different locations and then virtualize an access to underlying physical devices in such a way that an updated copy of said block is addressed if said block was read from the source storage 210, and the unchanged copy of said block is addressed if said block was read from the virtual device 225. In the described embodiment the copy-on-write technique is used and so unchanged copies of updated blocks are copied outside the source storage 210 while updated copies of updated blocks are placed to actual locations on the source storage 210.

The I/O writes monitor 260 inspects write activity on the source storage 210. Once a write request has been detected on the source storage 210 that should overwrite one or more blocks listed in the watch-list 235, then said write request is suspended and original contents of said blocks are copied to the retention container 240 for the purpose of store within temporal stores 250. As soon as original contents of said blocks are copied, said blocks are removed from the watch-list 235 and the write request is resumed.

The retention container 240 is responsible for storing original contents of updated blocks and control of temporal stores 250. Temporal stores 250 can be at least one memory buffer 252, some files 254, some partitions, or disks, or devices (256) as well as a combination of above. A temporal stores configuration is configured a priori from the backup utility 200 and is sent to the snapshot manager 230 as initialization parameters at the beginning of a backup routine.

The retention container 240 includes a scope of preserved blocks. The scope of preserved blocks is stored in the retention-list 245. A space allocation list 246 is used for improved management of space within temporal stores 250. Details of an interior implementation of the retention-list 245 and the space allocation list 246 are generally irrelevant within the scope of the present invention. In the described embodiment the retention-list 245 is a hierarchy of dual-reference for continual extents of blocks for the source storage 210 and temporal stores 250, and the space allocation list 246 is a hierarchy of continual extents of unused blocks per temporal store.

FIG. 4 illustrates basic principles of operation of COW snapshots. Suppose the source storage 210 contains 8 blocks from which the blocks 2, 3, 5 and 6 contain a set of data "A", "B", "C" and "D" respectively and other blocks are free in a file system installed on the source storage 210. When a COW differential snapshot of the source storage 210 has been created and a virtual device 225 has been created and enabled in the system, snapshot management means establish a logical correspondence between blocks of the source storage 210 and the virtual device 225. The used blocks 2, 3, 5 and 6 constitute the preservation area of the snapshot 220. If at this moment the virtual device 225 and the source storage 210 were compared block-by-block, then snapshot management means redirect all read requests to the source storage 210 and so one would find their contents identical.

When a write request 431 to the block 6 of the source storage 210 has been issued then snapshot management means inspect request parameters and determine that it addresses to a block included to the preservation area of the snapshot. The write request 431 is suspended (step 423), original contents of the block 6 are copied to the temporal stores 250 (step 441) and the write request 431 is resumed (step 453). The snapshot manager remembers that the block 6 has been preserved and establishes a relationship 442 of data stored in the temporal stores 250 with the block 6 of the virtual device 225. The snapshot will ignore further I/O requests to the block 6.

When a read request 471 to the block 5 of the virtual device 225 has been issued then the snapshot manager analyzes the type of the addressed block. As the block 5 is not in the scope of updated-and-preserved blocks the request 461 will be redirected to the source storage 210 (step 462). As a result the "C" data will be returned (steps 463 and 464).

When a read request 471 to the block 6 of the virtual device 225 has been issued then snapshot management means analyze the type of the addressed block. As the block 6 is preserved the request 471 will be redirected to the temporal stores 250 (step 472). As a result the original data "D" will be returned (steps 473 and 474) while on the source storage 210 the block 6 contains another updated data "E".

FIG. 5 is a flowchart diagram representing an implementation of write requests processing on a source storage applied in the described embodiment. The I/O monitor 260 is integrated to the I/O requests stack so that it intercepts requests for reading and writing to blocks of logical volumes. File-related I/O requests are controlled on above levels within the I/O requests stack, and block device related I/O requests are controlled on lower levels of the stack. In particular, in Microsoft Windows 2000 family operating systems the I/O monitor 260 is realized as an upper filter driver for the storage volumes class. In an alternative embodiment of the present invention requests for reading and writing to blocks of devices are intercepted.

The routine of I/O requests processing (entry 500) begins with filtering I/O write requests (step 501) that are addressed to blocks located on logical volumes included to the source storage 210 (step 502). It is further checked if a continuous portion of blocks addressed in the write request intersects with the scope of blocks listed in the watch-list 235 (condition 505). Improper I/O requests are passed to next levels of the I/O stack for further processing. Matched write requests are suspended until addressed blocks are retained in the retention container 240.

If said matches were found then the portion of addressed blocks is iteratively split into continuous extents (of blocks) with each extent entirely matched the watch-list 235 (step 506). Matched extents of addressed blocks are excluded from the watch-list (step 510) in order to eliminate further attempts to preserve these blocks. Then the snapshot manager 230 reads requested appropriate blocks from the source storage 210 (step 520) into a memory buffer and inspect results of the operation (525). If the read operation 520 failed, the snapshot manager 230 finishes the routine 500 as if it were "successful". Due to this specific behavior the snapshot management means need not including a complicated error-handling module. Instead, a corrupted block becomes excluded from the preservation area of the snapshot. If later an application read this block from the snapshot, its request will be redirected to an appropriate block of a source storage, and so an application will receive same error and will be able to apply a complicated error handling routine.

In case of successful data reading the block preservation subroutine 527 is invoked in order to store original contents of the block to the retention container 240. The subroutine 527 returns the actual status of the block preservation: either "OK" or "block is not preserved". Upon completion of the block preservation subroutine 527 the returned status is checked (step 585). In case block contents were not correctly preserved the snapshot is treated as failed and the subroutine 590 of the snapshot destruction is executed. In this case applications that use the snapshot will receive an "invalid drive" error or the like when trying to read snapshot data.

FIG. 5B represents a flowchart diagram for the block preservation subroutine 527. First, it is checked whether block data can be stored to temporal stores 250 without extending them (condition 530). The space allocation list 246 is used for fast selection of an appropriate temporal store. Then block data are stored in the selected temporal store (step 535). The resulted status is checked (condition 540). In case of successful data preservation the original block location and the stored data address are added to the retention-list 240 and, the space allocation list 246 is also corrected (step 545), and the status of successful data preservation is returned (step 581). In case of the data preservation failed (see step 540) the retention container 240 corrects the space allocation list 246 by marking bad locations in the selected temporal store (step 550) and repeats the preservation process from the step 530.

If no space were found for data preservation (see step 530) then the subroutine 527 tries to extend some of temporal stores. Within the frame of the described embodiment of the present invention memory buffers 252 and temporary files 254 are treated as extensible stores while partitions and disks are not. Every temporal store is described by allocation information and values of initial and maximum capacity. Extensible temporal stores are iteratively increased (steps 560 and 570) and checked for the ability to fit specified data. Finally, in case the subroutine 527 fails to preserve specified data, the error status "data not preserved" is returned to the snapshot manager 230. In this case the snapshot manager 230 will automatically destroy the current snapshot and the backup procedure fails upon receiving a "device is not ready" I/O error at an attempt to read data from the virtual device of the snapshot.

FIG. 6 represents a flowchart diagram of an implementation of data retrieval from the snapshot applied in the described embodiment. The snapshotted block retrieval subroutine 600 begins (step 605) with acquiring a requested block from the retention container 240, by invoking the retained data retrieval subroutine 610. The subroutine 610 returns retrieved data and the status of the operation. The returned status is checked (step 680) and in case of successful data retrieval the subroutine 600 returns retrieved data and the status of successful data retrieval (step 691). In case data were preserved by the retention container 240 but there was an error at data retrieval (condition 690) the requested block is forcedly removed from the retention container 240 by invoking the data removal subroutine 700, and the read error status is returned (step 692). In case the requested block was not preserved in the retention container 240, the subroutine 600 reads the requested block from the source storage 210 by invoking operating system API. The result and the status of the operation are returned by the subroutine 600 to a caller.

The retained data retrieval subroutine 610 first checks the presence of the requested block in the retention-list 245 (step 620). In case the requested block is present in the retention-list 245, a temporal store containing preserved contents of the block is selected for further processing. The subroutine 610 tries to read preserved contents of the block (step 640) from the selected temporal store. The status of the operation is checked (condition 650) and an appropriate status and retrieved data are returned to the subroutine 600.

Totally, the snapshot manager work in such a way that only preserved blocks are retrieved from the retention container at reading snapshot data while all other blocks are always read from the appropriate blocks of the source storage.

FIG. 7 represents a flowchart diagram of a routine of blocks removal from a shrinkable snapshot. The blocks removal routine provides the functionality of snapshot shrinking and is the essential part of the present invention.

The block removal subroutine 700 removes block references from the watch-list 235, deletes proper references from the retention-list 245 and releases retained data from temporal stores 250, and so providing shrinking of the preservation area of the snapshot 220. The subroutine 700 begins with identifying a set of blocks the given block belongs to. In case the block is referenced in the watch-list (condition 705), a proper reference is deleted from the watch-list 235 (step 710). As soon as a block is no more referenced in the watch-list, it is no more watched by the snapshot manager for updates and thus no resources will be allocated for preserving original block contents.

If a block was not referenced in the watch-list 235 it may be referenced in the retention-list 245. A preserved data removal subroutine 720 is then invoked in order to release resources that may be used for retaining original block contents. First, the subroutine 720 searches for references to the block in the retention-list 245 (condition 730). In case the block is referenced in the retention-list 245, the found reference is deleted from the retention-list 245 (step 740). Next, a temporal store containing preserved data of said block is identified (step 750) and appropriate entries in the space allocation list 246 are found and edited, so that space allocated for preservation of said block are then interpreted as unused (step 760). Finally, a garbage collection routine 790 is invoked for the purpose of compaction and further truncation of temporal stores.

The described method provides a novel functionality of reducing the preservation area during the snapshot operation.

The preservation area of a snapshot identifies the scope of blocks of a source storage, for which the point-in-time and the updated data are to be stored separately. The larger preservation area of a snapshot, the more resources are required for snapshot maintenance. Prior art snapshot technologies do not allow reducing the preservation area during the snapshot operation. For read-only snapshots the preservation area is determined at the snapshot creation and is kept unchanged. For read-write snapshots the preservation area only can be extended during the snapshot operation.

As the preservation area is not reduced, the amount of updated data can only grow, and so the amount resources required for snapshot maintenance is increased as well. The disclosed method of the present invention allows excluding blocks from the preservation area within the whole period of snapshot existence. The disclosed embodiment of the present invention illustrates implementation of the present invention in online backup.

FIG. 8 illustrates a time diagram of a snapshot creation. The snapshot creation stage exploits the method of the snapshot shrinking that constitutes the essence of the present invention. At the beginning of online backup procedure (timestamp 800) the backup utility 200 sends a request 801 to the snapshot manager 230 for creation of a shrinkable snapshot 220 of a storage source 210 with specifying configuration parameters for the storage source 210 and temporal stores 250. The snapshot manager 230 sends a request 802 to the retention container 240 for initialization 805 of temporal stores 250. The initialization procedure 805 includes steps of allocation of memory buffers 252, optional creation and pre-allocation of temporal files 254 and optional initialization of dedicated temporal partitions 256. The retention-list 245 and the space allocation list 246 are initialized during the initialization procedure 805 as well. In case the retention container 240 failed to complete the initialization procedure 805, an error status is returned to the snapshot manager 230 and the snapshot manager 230 returns the snapshot creation failure status to the backup utility 200. In this case the backup utility 200 should analyze and handle errors of snapshot creation. Details of an interior implementation of that step are generally irrelevant within the scope of the present invention. In the described embodiment the backup procedure is cancelled and a user is informed about the problem and its reason.

In case of successful completion of the initialization procedure 805, the snapshot manager 230 sends a request 810 to operating system file services 185 for suspending further I/O writes followed by a request 820 to file services 185 for flushing file system cache on all logical volumes included to the storage source 210. While the process 825 of flushing file system cache runs, the snapshot manager 230 performs a routine 830 of file system flush completion detection. Details of an interior implementation of the routine 830 are generally irrelevant within the scope of the present invention. The routine includes a set of techniques essentially dependent on a type of the operating system 170 controlling the computer system 100 and types of file systems installed on logical volumes constituting the source storage 210. For example, in the Microsoft Windows NT family operating systems requests 810 and 820 can be replaced by a single request, yet only for so-called Windows NT native file systems. In addition, an operating system informs applications about completion of a file system flush.

As soon as the file system flush completion is detected, the snapshot manager 230 creates the shrinkable snapshot 220 of the source storage 210. The I/O monitor 260 activates the COW technique against I/O write requests addressed to logical volumes constituting the source storage 210 (step 835).

Then the snapshot manager 230 sends a request 839 to file services 185 for resuming I/O writes. From this point the point-in-time and the current copy of data stored on the source storage 210 coexist.

The time interval 899 between the request 810 and the request 839 is a brownout period at which production applications and an operating system cannot write to logical volumes constituting the source storage 210. In practice, the time interval 899 lasts from a fraction to few seconds on modern computer systems.

The snapshot manager 230 exposes the shrinkable snapshot 220 as a virtual device 225 in the operating system 170 (step 830). The virtual device 225 is represented in the system as containing multiple logical volumes of same size and type as appropriate logical volumes constituting the source storage 210.

Initially the preservation area of the snapshot 220 includes all blocks of the source storage 210. As soon as contents of the snapshot 220 become accessible through the intermediation of the virtual device 225, the snapshot manager 230 performs an identification of a scope of used blocks per every volume located on the virtual device 225 (step 840). A scope of used blocks of a logical volume is commonly referred to as volume bitmap in the field of art. Details of an interior implementation of a volume bitmap identification routine 840 are generally irrelevant within the scope of the present invention. In the described embodiment a combined technique is used for that purpose. The snapshot manager 230 either acquires the volume bitmap from the operating system or uses built-in means for file system allocation analysis depending on system abilities. In particular, in the Microsoft Windows NT family operating systems the snapshot manager uses system functions to retrieve a volume bitmap for Windows NT native file systems. Built-in means are used for file system allocation analysis for other file systems. In other operating systems only built-in file system analysis means are used.

The volume bitmap data are analyzed (step 850) and then all unused blocks are excluded from the preservation area of the snapshot 220. The step 860 in the FIG. 8 denotes a subroutine of removal of all unused blocks from the snapshot by iterative invoking the block removal subroutine 700. After completion of the step 860 the preservation area of the snapshot 220 includes only used blocks of all logical volumes constituting the source storage 210. At this instant the shrinkable snapshot 220 has same preservation area as a prior art differential snapshot would have, however, it exhibits shorter brownout period 899. In prior art a volume bitmap identification routine has to be performed on a source volume after the write activity suspension (request 810) and before the write activity resumption (request 839), and so the brownout period 899 was longer.

At this point the snapshot creation subroutine is completed. The snapshot manager 230 returns a descriptor of the snapshot 220 to the backup utility 200 (step 869).

As soon as the snapshot descriptor has been received the backup utility 200 starts the snapshot customization procedure (timestamp 870) in order to further reduction of the snapshot preservation area by excluding unnecessary data from the snapshot. This procedure usually comprises a comprehensive file system analysis 871 and parsing of a user-defined backup task that specifies files, directories and other file system objects to be backed up. As the backup utility 200 from the described embodiment implements a block-level backup, the additional stage 872 of identifying file allocation information for every unnecessary object is required. Upon completion of the stage 872 the backup utility 200 performs a procedure 873 of unnecessary blocks removal, by an iterative invoking the block removal subroutine 700.

The timestamp 890 indicates completion of the shrinkable snapshot customization. At this moment the preservation area of the shrinkable snapshot 220 include only data required for backup. The scope of blocks, for whom an original contents preservation can be applied, is less than one in prior art differential snapshots.

Further advantage of a shrinkable snapshot can be demonstrated by using a shrinkable snapshot aware backup utility in an online backup routine. A straightforward application of the concept of a shrinkable snapshot is an idea that a backup utility should regularly remove backed up blocks from the shrinkable snapshot.

FIG. 9 illustrates a preferred flowchart diagram of a backup routine based on a shrinkable snapshot implemented in the described embodiment of the present invention. At the beginning of an online backup procedure, the backup utility 200 creates a shrinkable snapshot (routine 800) and verifies the returned status (step 905). In case the snapshot creation routine 800 failed, the backup procedure is finished. Upon successful snapshot creation the backup utility 200 analyzes data allocation on all volumes included to the snapshot and compiles the backup-list 205 from blocks that constitute files selected for backup. Other blocks of the snapshot constitute a collection of unnecessary blocks. Unnecessary blocks are removed from the shrinkable snapshot 220 (step 873). The backup utility 200 performs initialization (915) of a data copying process and sets up backup media.

The procedure of data backup is essentially a repetition of a sequence of actions executed (condition 920) until all blocks from the backup-list 205 are stored in a backup storage 208. The iteration begins with selection of a block from the backup-list 205 (step 925). The backup utility 200 tries to read the selected block from the virtual device 225 by invoking standard I/O functions available in the operating system 170.

The block I/O request 926 is finally translated to an invocation of the block retrieval subroutine 600. The returned result is then checked (condition 935). In case of successful read status, retrieved data are backed up (step 940). Otherwise an error handling subroutine 950 has been invoked. Details of an interior implementation of an error handling subroutine 950 are generally irrelevant within the scope of the present invention. In the described embodiment the subroutine 950 first checks settings of the backup utility 200 and in case the automatic error handling is disabled a warning message is displayed giving a user four choices of the error handling: (1) retry reading the block (2) abort the backup procedure, (3) ignore the error status (4) accept the error status and continue. In the latter case the backup utility 200 puts the block failure flag in the backup image without storing block data.

As soon as the block is backed up or an error is handled, the block is removed from the backup-list 205 (step 960) and, the backup utility 200 invokes the block removal subroutine 700 in order to remove said block from the snapshot preservation area (step 961). After removal of a block, the program reiterates the backup-list processing from the step 920 until the backup-list 205 becomes empty.

A further elaboration of the concept of a shrinkable snapshot is demonstrated by using a read-once shrinkable snapshot in online backup. The background of the idea is the following: as soon as the backup utility 200 has compiled the backup-list 205 and has removed unnecessary blocks from the shrinkable snapshot 220, every block of the snapshot 220 will be read by the backup utility 200 only one time. So that a functionality of automatic removal of blocks from a shrinkable snapshot can be embedded to the shrinkable snapshot, thus permitting a simpler design of the backup utility and permitting less overheads due to reducing inter-module invocations. A mode of snapshot operation when every read block is automatically removed from the preservation area of the shrinkable snapshot is named as "read-once mode".

It is obvious that data allocation analysis combined with the backup procedure require some blocks reading more than once, and so the snapshot should support both an ordinary "read-many" mode and the "read-once" mode of snapshot operation.

FIG. 10 is a flowchart diagram illustrating a backup routine based on a shrinkable snapshot working in the read-once mode. Operation the backup utility 200 is mostly same as in the previous illustration with only few variations. For the purpose of the description simplification the changed items of the flowchart are outlined by dotted rounded contours.

The backup procedure based on the read-once snapshot is initiated in same way as the previously described backup procedure based on shrinkable snapshot (steps 800, 905, 910, 873 and 915). Initially a snapshot operates in the read-many mode. As soon as the backup utility 200 is ready for performing the block-level backup of snapshotted data, the snapshot 220 is switched to the read-once mode (step 1016).

The iterative procedure of copying data from a snapshot is performed in same manner as in the previous illustration, with the only difference that the backup utility 200 is no more invokes the block removal subroutine 700 explicitly (the step 961 is abandoned). Instead, the snapshot manager 230 automatically removes every block read from the snapshot. An error handling subroutine 1050 may also be changed in comparison to the subroutine 950. As soon as snapshot has worked in the read-once mode, it is impossible anyway to read preserved block contents twice. Thus if a read error occurred when reading a preserved block, a secondary request to re-read that block will be automatically redirected by the snapshot manager 230 to an appropriate block of the source storage 210. For this reason, the error handling subroutine 1050 should not suggest a user to retry a failed read operation.

FIG. 11 is intended to help understanding basics of a backup process with using a shrinkable snapshot in the "read-many" mode represented in FIG. 9. The backup process includes a repetition of elementary actions of data portions retrieval from the snapshot. FIG. 11 illustrates a layout of such elementary actions.

Timestamp 1100 indicates an action of backing up an updated block M. The backup utility 200 acquires block M from the snapshot manager 230 (step 1105). The block M has been updated, and so its original contents have been preserved in the retention container 240. The snapshot manager 230 redirects the request to the retention container 240 (step 1107). The retention container 240 invokes the block retrieval subroutine 600 and returns data to the snapshot manager 230, which in turn returns data to the backup utility 200 (steps 1112 and 1115).

The backup utility 200 performs a subroutine 1120 for backing up the retrieved portion of data. Details of an interior implementation of actions 1120 are generally irrelevant within the scope of the present invention. In the described embodiment of the present invention these actions depend on user-defined settings of a backup operation and may comprise sub-actions of data compression, data encryption, updates identification if working in block-by-block differential mode, and so on.

Upon completion of the subroutine 1120 the backup utility 200 commands the snapshot manager 230 to remove the backed up block M from the snapshot (step 1125). The snapshot manager 230 invokes the block removal subroutine 700, which in this case directs the retention container 240 to remove the block M from the retention-list 245 (step 1140) and releasing space allocated in temporal stores 250 for preserving original contents the block M (step 1145). In parallel, the backup utility 200 removes references to the block M from the backup-list 205 (step 1135).

The essence of steps performed within the action 1100 is progressive freeing of occupied space in temporal stores, whereby a probability of a need for extending temporal stores is reduced.

Timestamp 1150 indicates an action of backing up an unchanged block N. The backup utility 200 acquires block N from the snapshot manager 230 (step 1155). The block N is unchanged, and so its original contents are still present in the source storage 210. The snapshot manager 230 redirects the request to the I/O subsystem 180 (step 1157) in order to read block N from the source storage 210.

As soon as the backup utility 200 has received requested data, it performs a subroutine 1120 for backing up retrieved portion of data. Then the backup utility 200 commands the snapshot manager 230 to remove the backed up block N from the snapshot (step 1165). The snapshot manager 230 invokes the block removal subroutine 700, which in this case only removes the block N from the watch-list 235 (step 1180). In parallel, the backup utility 200 removes references to the block N from the backup-list 205 (step 1185).

The essence of steps performed within the action 1150 is progressive reducing of a scope of watched blocks, whereby a probability of a need for data preservation is reduced.

FIG. 12 is intended to help understanding basics of a backup process with using a shrinkable snapshot in the "read-once" mode represented in FIG. 10, by illustrating a layout of elementary actions of data portions retrieval from the snapshot in same fashion as made in FIG. 11.

As it can be revealed from comparison of FIG. 9 and FIG. 10, the backup procedure based on a shrinkable snapshot operating in read-once mode, is insignificantly different from one based on a read-many mode. However, while algorithmic parts remain almost unchanged, these parts now are supplied with more possibilities for working in parallel. A multi-threaded realization would get an additional performance gain from said parallelism. The described embodiment of the present invention do has a multi-threaded architecture for exploiting available advantages of the read-once mode.

Because of general similarity of a backup procedure based on the read-once mode and one based on the read-many mode and accordingly, of FIG. 9 and FIG. 10, the common parts will be noted briefly while differences will be emphasized.

Timestamp 1200 indicates an action of backing up an updated block M. The backup utility 200 acquires block M from the snapshot manager 230, and the request is passed to the retention container 240. The retention container 240 retrieves data from temporal stores 250 and, retrieved data are returned to the backup utility 200 (timestamp 1115).

From that moment (timestamp 1115), the backup utility 200 and the snapshot manager 230 work in parallel: the backup utility 200 performs the backup subroutine 1120, while the snapshot manager 230 performs the block removal subroutine 700, which in this case directs the retention container 240 to remove the block M from the retention-list 245 and releasing space occupied by original copy of the block M in temporal stores 250.

Timestamp 1250 indicates an action of backing up an unchanged block N. The backup utility 200 acquires block N from the snapshot manager 230, and the request is passed to I/O subsystem 180. The block N is read from the source storage 210 and, retrieved data are returned to the backup utility 200 (timestamp 1165).

From that moment (timestamp 1115), the backup utility 200 and the snapshot manager 230 work in parallel: the backup utility 200 performs the backup subroutine 1120, while the snapshot manager 230 performs the block removal subroutine 700, which in this case removes the block N from the watch-list 235.

The advantage of the read-once mode is that the backup utility 200 and the snapshot manager 230 are early running in parallel. The reduced resource consumption and performance gain are achieved due to earlier shrinking of a summary scope of blocks controlled by a snapshot including both preserved blocks and watched blocks. It is well known in the art that in nowadays computer systems compression and encryption of a portion of data elapses commensurable time in comparison with reading that portion of data from a nowaday mass storage system. With taking into account that fact it is obvious that early shrinking of a snapshot indeed gives advantages in resource consumption and performance the more appreciable the longer backup routine lasts.

FIG. 13 illustrates how the space allocation list 246 represents information about layout of temporal stores. The space allocation list 246 identifies continuous extents of used space (1340) and unused space (1350) within every particular temporal store 1300 connected and used by the retention container 240 for storing original copies of updated blocks. Detailed information about every particular chunk of continuously allocated preserved blocks (1320) can be retrieved from the retention-list 245.

The garbage collection routine 790 is purposed for compacting data within every temporal stores and, shrinking those temporal stores having changeable size, which are memory buffers 252 and temporary files 254. Dedicated partitions and disks 256 are treated as unchangeable temporal stores and so shrinking is not applied to them.

FIG. 14 illustrates basic ideas of a method for compacting and shrinking temporal stores implemented in the described embodiment. Details of an interior implementation of the garbage collection routine 790 are generally irrelevant within the scope of the present invention. Principles of operation of the garbage collection routine 790 used in the described embodiment are briefly presented in the following text.

FIG. 15 represents a flowchart of an embodiment of a garbage collection routine. The garbage collection routine 790 is invoked by the block removal routine 700 every time a portion of blocks is removed from the retention container 240 and tries to compact a temporal store, from which blocks were removed that time. However, the data compaction method is run on the temporal store only in two cases: first, at high fragmentation of unused space in a temporal store, exactly in case amount of fragments of unused space exceeds a particular threshold value (threshold 1) and second, in case of low use of a store, exactly in case a percentage of used space is below a particular threshold value (threshold 2).

In order to avoid prolonged delays caused by extensive compaction, the routine 790 is allowed to perform a limited amount of elementary compaction acts per every invocation (threshold 3). As soon as the counter of elementary compaction acts within a single call exceeds the threshold 3, the routine 790 is finished leaving the processed store in partially compacted state. However, at next event of a block removal from that store the garbage collection routine 790 continues compacting that store.

The compaction method is illustrated in FIG. 14, for the purpose better understanding. Let assume (1) on FIG. 14 illustrates a layout of a temporal store 1300 at the beginning of the garbage collection routine 790. For the purpose of simplifying the explanation, the following term will be used: (a) "last" will denote "having the largest address within the space of the temporal store" and, (b) "first" will denote "having the least address within the space of the temporal store".

The routine 790 retrieves layout of chunks of blocks on the temporal store 1300 and starts the first compaction stage 1520. At the first stage 1520, the routine 790 repetitively tries to move the last chunk of blocks (1525) to a first found fragment of unused space (1527) of same or larger size (steps (2) and (3) on FIG. 14). As soon as a chunk of blocks is moved (1533), the space allocation list 246 and the retention-list 245 are corrected properly (1535). The first compaction stage quits upon first unsuccessful attempt (1530) to find an appropriate unused fragment, or upon exceeding the amount of enabled compaction acts (1515).

At the second compaction stage 1540, the routine 790 repetitively moves chunks of blocks towards beginning of temporal store (steps (4) through (6) on FIG. 14). As soon as a chunk of blocks is moved, the space allocation list 246 and the retention-list 245 are corrected properly. The second compaction stage is finished upon compaction of all chunks, or upon exceeding the amount of enabled compaction acts (1555).

For shrinkable temporal stores such as files, the final stage (1590) of store truncation is executed (steps (7) and (8) on FIG. 14). The routine 790 evaluates size of the trailing fragment of unused space (1570). In case its size exceeds a threshold value (threshold 4), the temporal store 1300 is truncated (1580) so that size of the trailing fragment of unused space become equal the threshold value.

In the described embodiment of the present invention the threshold 1 value (amount of fragments) is equal to 128, the threshold 2 value (percentage of used space) is equal to 50%, the threshold 3 value (limit to amount of compaction acts) is equal to 16 and, the threshold 3 value (limit to amount of compaction acts) is equal to 16 megabytes.

In an alternative embodiment of the present invention the criterion for limiting of amount of compaction acts was replaced by a criterion for maximum summary capacity of chunks of blocks that can be moved to another location per every invocation of the garbage collection routine 790.

The garbage collection routine plays a secondary role within the scope of the present invention. It allows optimizing the use of temporal stores and reducing size of ones whose interior arrangement permits dynamic size changing, at the expense of additional overheads. The garbage collection routine is useful when running the described embodiment on computer systems having limited resources.

The foregoing description has been directed to the particular embodiment of the present invention. However, it will be apparent to those skilled in the art that certain variations and modifications may be made to the described embodiment, with the accomplishment of its advantages. Therefore, it is the object of the claims to cover such variations and modifications as come within the true spirit and scope of the invention.

We claim:

1. A method for shrinking a set of data, comprising:
    providing a writable volume presented in a computer and used for storing data;
    providing a differential snapshot of one or more blocks of said volume, said differential snap shot comprising:
        a retention container for storing copies of the one or more blocks of said volume;

a watch-list structure identifying a first set of blocks of said volume remaining unchanged since a moment of creation of said snapshot;

a retention-list structure identifying updated blocks of said volume and keeping associations of references to said updated blocks with references to original copies of said updated blocks stored in said retention container;

a space allocation list structure identifying unused space in said retention container;

providing an input structure specifying a second set of blocks of said volume to be removed from a set of data included in said snapshot;

providing to said computer a set of instructions, said computer operable to execute said instructions to perform:

removing references to said second set of blocks from said watch-list, adding locations referenced by said associations stored in said retention-list which include references to blocks specified by said input structure into said space allocation list:

removing associations stored in said retention-list which include references to blocks specified by said input structure from said retention-list;

releasing retained data from said retention container; and whereby the number of unchanged blocks included into said snapshot is shrunk.

2. The method of claim 1, further comprising the following steps:

compacting allocation of portions of used space within said retention container; and reducing size of said retention container;

wherein the steps of compacting and reducing are executed after the steps of removing references to the second set of blocks, adding locations and removing associations.

3. A method for performing a snapshot-based online backup with shrinking a set of data included into a snapshot, the method comprising:

providing a writable storage for storing blocks of data;
providing a backup storage for storing data backup;
providing snapshot management means used for controlling a differential snapshot of blocks of said writable storage, said differential snapshot comprising:

a retention container used for storing a copy of any of said blocks of data;

a watch-list structure identifying blocks of said writable storage remaining unchanged since a moment of creation of said snapshot;

a retention-list structure storing associations of references to updated blocks of said writable storage with references to original copies of updated blocks stored in said retention container;

a space allocation list structure identifying unused space in said retention container;

a snapshot shrinking subroutine used for removing block identification data from said watch-list and removing associations data from said retention-list, said subroutine taking a structure specifying blocks of storage as input data, said subroutine comprising instructions for executing the following steps on a computer:

removing references to blocks specified by input data from said watch-list;

adding locations referenced by associations from said retention-list, which include references to blocks specified by input data, into said space allocation list;

releasing retained data from said retention container;

removing associations, which include references to blocks specified by input data, from said retention-list;

creating a differential snapshot of said writable storage;

compiling a backup-list of blocks required to back up by analyzing file allocation on said snapshot; and performing a backup of portions of blocks included into said backup-list until said backup-list becomes empty, the step of performing a backup comprising by iteratively executing at least the following steps:

reading a portion of blocks from said snapshot into a memory buffer for further processing and storing on said backup storage;

invoking said snapshot shrinking routine with specifying a structure identifying locations of blocks included into said portion as input data;

removing references to blocks included into said portion from said backup list.

4. The method of claim 3, further comprising the following steps of:

compiling a map of surplus blocks not needed to back up, by analyzing file allocation on said snapshot;

invoking said snapshot shrinking routine with specifying said map of surplus blocks as input data;

wherein the step of compiling a map is executed after the step of creating a differential snapshot and before the step invoking said snapshot; and wherein the step of invoking said snapshot is performed before the step of compiling a backup-list.

5. The method of claim 4, wherein the step of creating a differential snapshot comprises the steps of suspending I/O write activity on said writable storage;

bringing a file system on said writable storage into consistent state;

starting copy-on-write technique for preserving point-in-time data on said volume;

resuming I/O write activity on said writable storage;

enabling access to point-in-time data stored on said snapshot;

computing a map of unused blocks in a file system located on said snapshot; and invoking said snapshot shrinking subroutine with specifying said map of unused blocks as input data.

6. A backup system for performing a snapshot-based online backup, the system comprising:

a writable storage for storing blocks of data;
a backup storage for storing data backup;
a computer system controlling said writable storage device and said backup storage, said computer system comprising:

snapshot management means for controlling a differential snapshot of data blocks of said writable storage system, said differential snapshot comprising:

a retention container used for storing a copy of any of said blocks of data;

a watch-list structure identifying blocks of said writable storage remaining unchanged since a moment of creation of said snap shot;

a retention-list structure storing associations of references to updated blocks of said writable storage with references to original copies of updated blocks stored in said retention container, a space allocation list structure identifying unused space in said retention container;

means for enabling access to data stored on a snapshot;

means for shrinking a set of data included to said snapshot, said means for shrinking operable to perform the steps of:
  removing references to specified blocks from said watch-list;
  adding locations referenced by associations stored in said retention-list which include references to said specified blocks into said space allocation list;
  releasing retained data from said retention container; and
  removing associations stored in said retention-list which include references to said specified blocks;
means for performing a snapshot-based online backup with shrinking a set of data included to a snapshot during backup operation, said means for performing a snapshot-based online backup operable, in an interactive manner, to:
  read a portion of blocks from said snapshot into a memory buffer for further processing and storing on a backup store;
  invoke said means for shrinking a set of data included to a snapshot with specifying locations of blocks from portion of blocks as input data.

7. The backup system of claim 6, wherein said retention container is stored on said writable storage.

8. The backup system of claim 6, wherein said retention container is stored on said writable storage.

9. The backup system of claim 6, wherein said retention container is a separate partition of said writable storage.

10. The backup system of claim 6, wherein said retention container is a file within a file system on said writable storage.

11. The backup system of claim 6, wherein backed up data blocks are restored on-the-fly to a different storage.

* * * * *